(12) United States Patent  (10) Patent No.: US 8,019,394 B2
Gitzinger et al.  (45) Date of Patent: Sep. 13, 2011

(54) COMPONENT PACKAGING FOR HANDHELD COMMUNICATION DEVICES

(75) Inventors: Thomas E. Gitzinger, Libertyville, IL (US); Rachid M. Alameh, Crystal Lake, IL (US); Paul M. Pierce, Grayslake, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 954 days.

(21) Appl. No.: 11/771,452

(22) Filed: Jun. 29, 2007

(65) Prior Publication Data

US 2009/0005131 A1 Jan. 1, 2009

(51) Int. Cl.
*H04M 1/02* (2006.01)

(52) U.S. Cl. ............... 455/575.3; 455/90.3; 455/347; 455/575.1

(58) Field of Classification Search ............... 455/575.3
See application file for complete search history.

(56) References Cited

U.S. PATENT DOCUMENTS

| | | | |
|---|---|---|---|
| 5,649,309 A | 7/1997 | Wilcox et al. | |
| 6,047,196 A * | 4/2000 | Makela et al. | 455/556.1 |
| D448,032 S * | 9/2001 | Talley | D14/396 |
| 6,295,358 B1 | 9/2001 | Kubota | |
| 6,616,233 B1 * | 9/2003 | Debus et al. | 297/341 |
| 6,708,046 B1 * | 3/2004 | Takagi | 455/575.3 |
| 6,731,912 B1 * | 5/2004 | Miyashita | 455/90.2 |
| 6,780,053 B1 * | 8/2004 | Yunker et al. | 439/607.2 |
| 6,785,127 B1 * | 8/2004 | Monney et al. | 361/679.01 |
| 6,862,459 B2 * | 3/2005 | Sawada et al. | 455/550.1 |
| 6,954,653 B2 | 10/2005 | Morita | |
| 6,990,711 B2 | 1/2006 | Koshikawa et al. | |
| 6,996,426 B2 * | 2/2006 | Granberg | 455/575.4 |
| 7,003,333 B2 * | 2/2006 | Chow et al. | 455/575.3 |
| 7,010,333 B2 * | 3/2006 | Trively | 455/575.3 |
| 7,028,373 B2 | 4/2006 | Harmon et al. | |
| 7,107,077 B2 * | 9/2006 | Lee | 455/566 |
| 7,181,253 B2 * | 2/2007 | Kim | 455/575.1 |
| 7,286,860 B2 * | 10/2007 | Harris | 455/575.2 |
| 7,383,066 B2 * | 6/2008 | Park | 455/575.1 |
| 7,409,225 B2 | 8/2008 | Kim et al. | |
| 7,433,179 B2 * | 10/2008 | Hisano et al. | 361/679.27 |

(Continued)

FOREIGN PATENT DOCUMENTS

EP 1439685 A1 7/2004

(Continued)

OTHER PUBLICATIONS

Malthe et al., U.S. Appl. No. 60/668,334, filed Apr. 5, 2005, 26 pages.*

(Continued)

*Primary Examiner* — Yuwen Pan
*Assistant Examiner* — Hai V Nguyen
(74) *Attorney, Agent, or Firm* — Gary J. Cunningham (57) ABSTRACT

A handheld communication device may comprise a first housing and a second housing. The first housing may include a first keypad and a battery. The second housing may include a second keypad, at least one display, and a printed circuit board. The second housing may be rotatable relative to the first housing between an open configuration and a closed configuration. The second keypad may face in a substantially same direction as the first keypad in the open configuration, and the second keypad may face in a substantially opposite direction to the first keypad in the closed configuration.

22 Claims, 6 Drawing Sheets

U.S. PATENT DOCUMENTS

| | | | |
|---|---|---|---|
| 7,499,074 B2 * | 3/2009 | Kim et al. | 348/14.02 |
| 7,529,521 B2 * | 5/2009 | Yunker et al. | 455/90.3 |
| 7,561,686 B2 * | 7/2009 | Vance | 379/433.13 |
| 7,708,228 B2 * | 5/2010 | Chaix et al. | 244/172.6 |
| 7,756,552 B2 * | 7/2010 | Haikola et al. | 455/569.2 |
| 7,756,554 B2 * | 7/2010 | Jung | 455/575.3 |
| 2002/0022503 A1 * | 2/2002 | Lee | 455/566 |
| 2002/0094826 A1 * | 7/2002 | Lee | 455/457 |
| 2003/0096582 A1 * | 5/2003 | Kim | 455/90 |
| 2004/0058720 A1 * | 3/2004 | Kubo et al. | 455/575.1 |
| 2004/0204129 A1 * | 10/2004 | Payne et al. | 455/566 |
| 2004/0204200 A1 * | 10/2004 | Park | 455/575.1 |
| 2004/0261223 A1 | 12/2004 | Wang et al. | |
| 2004/0264118 A1 * | 12/2004 | Karidis et al. | 361/683 |
| 2005/0091431 A1 * | 4/2005 | Olodort et al. | 710/72 |
| 2005/0125570 A1 * | 6/2005 | Olodort et al. | 710/15 |
| 2005/0208903 A1 * | 9/2005 | Sakamoto | 455/90.3 |
| 2006/0030375 A1 * | 2/2006 | Tanaka | 455/575.1 |
| 2006/0034042 A1 * | 2/2006 | Hisano et al. | 361/681 |
| 2006/0063570 A1 | 3/2006 | Nishimura | |
| 2006/0183505 A1 * | 8/2006 | Willrich | 455/566 |
| 2007/0129121 A1 * | 6/2007 | Chambers et al. | 455/575.4 |
| 2007/0142101 A1 * | 6/2007 | Seshagiri et al. | 455/575.4 |
| 2007/0184786 A1 * | 8/2007 | Kim | 455/90.3 |
| 2007/0192990 A1 | 8/2007 | Christensen | |
| 2007/0197268 A1 | 8/2007 | Terada et al. | |
| 2007/0197271 A1 * | 8/2007 | Haikola et al. | 455/575.8 |
| 2007/0254729 A1 * | 11/2007 | Freund | 455/575.3 |
| 2007/0265028 A1 | 11/2007 | Jorgensen | |
| 2008/0125195 A1 * | 5/2008 | Maenpaa | 455/575.3 |
| 2008/0125196 A1 * | 5/2008 | Ryu | 455/575.3 |
| 2008/0214252 A1 * | 9/2008 | Oten et al. | 455/575.8 |
| 2008/0300030 A1 * | 12/2008 | Wang | 455/575.3 |
| 2008/0307658 A1 * | 12/2008 | Jun | 30/255 |
| 2009/0011802 A1 * | 1/2009 | Malthe et al. | 455/575.1 |
| 2009/0017875 A1 * | 1/2009 | Boesen | 455/566 |
| 2009/0137274 A1 * | 5/2009 | Kim et al. | 455/556.1 |
| 2009/0170571 A1 * | 7/2009 | Alameh et al. | 455/575.3 |
| 2009/0176473 A1 * | 7/2009 | Fellner | 455/404.1 |
| 2009/0253472 A1 * | 10/2009 | Kim | 455/575.1 |
| 2010/0151923 A1 | 6/2010 | Alameh et al. | |
| 2010/0188807 A1 | 7/2010 | Alameh et al. | |
| 2010/0210326 A1 * | 8/2010 | Ladouceur et al. | 455/575.3 |

FOREIGN PATENT DOCUMENTS

| | | | |
|---|---|---|---|
| EP | 1617630 A1 * | 1/2006 | |
| KR | 20010087236 A | 9/2001 | |
| KR | 20030032223 A | 4/2003 | |
| KR | 20030083751 A | 10/2003 | |
| KR | 1020060010333 A | 2/2006 | |
| WO | WO 9819434 A1 * | 5/1998 | |
| WO | 2006007222 A1 | 1/2006 | |
| WO | 2008142426 A2 | 11/2008 | |

OTHER PUBLICATIONS http://www.samsung.com/Products/MobilePhones/Sprint/SPH_N200SSXAR.asp; Samsung SPH-N200.

Patent Cooperation Treaty, "PCT Search Report and Written Opinion of the International Searching Authority" for International Application No. PCT/US2008/086756 (CS34256) Jun. 17, 2009, 10 pages.

United States Patent and Trademark Office "Non-Final Rejection" for U.S. Appl. No. 12/183,205 (CS34256) Feb. 4, 2011, 24 pages.

Patent Cooperation Treaty, "PCT Search Report and Written Opinion of the International Searching Authority" for International Application No. PCT/US2010/022025 (CS36332) Mar. 26, 2010, 11 pages.

United States Patent and Trademark Office, "Notice of Allowance and Fee(s) Due" for U.S. Appl. No. 12/361,682 (CS36332) Oct. 14, 2010, 31 pages.

* cited by examiner

COMPONENT PACKAGING FOR HANDHELD COMMUNICATION DEVICES

TECHNICAL FIELD

The present disclosure is directed to electronic devices such as, for example, handheld communication devices. More particularly, the present disclosure is directed to component packaging for handheld communication devices such as, for example, cellular telephones, which have at least a two-part housing, where a first housing member is adapted to rotate relative to a second housing member. In various aspects, the disclosure is directed to component packaging arrangements that facilitate manufacture of a thin phone and one-handed opening of such a thin phone.

BACKGROUND

There is an interest in making certain handheld electronic devices, such as cellular telephones, with a seamless design look. Making such devices with a seamless design look makes them more visually attractive to users and more likely that users will accessorize their wardrobe with such attractive devices.

Concurrently there is a trend toward increasing the functionality of handheld electronic devices. In the case of cellular telephones, increased functionality may include providing operability on multiple frequency bands using multiple protocols and/or providing the ability to take and playback photographs and/or video clips. Adding more functionality often leads to increased components and/or circuit elements, which often corresponds to increased space requirements, which is at odds with the desire to make devices smaller. Thus, generally, the volume available for accommodating components is at a premium.

Depending upon the overall design and usage goals, the reduction of some dimensions may be more desirable than the reduction of other dimensions. For example, while smaller is generally thought to be better in connection with overall size, size reduction can be limited by usage requirements, where if certain components of a device, such as the keypad, are allowed to shrink too much, the device may become difficult to operate. In other instances, there may be a desire to support ever larger components, such as in the case of display screens. Consequently, it becomes a balancing act of competing tradeoffs, when the components are placed relative to one another.

One of the dimensions for which there is some desire to further reduce the size of the device includes depth. Historically, a reduction in depth has been at least partially achieved by minimizing the depth of each of the individual components contained in a particular component stack up. While this is a valid approach for reducing the overall depth, at any given time, there may be limits as to how far the depth of a particular component may be reduced.

It may be desirable to adjust dimensioning of a handheld electronic device in a particular direction by rearranging one or more of the components and/or repositioning a hinge assembly and corresponding hinge axis. Rearranging one or more of the components and/or repositioning a hinge assembly and corresponding hinge axis may allow some of the components to be shifted relative to other components, with the potential overall effect of achieving an aggregate dimension in one or more directions, such as depth, which meets the desired results. The repositioned hinge assembly may also facilitate one-handed opening of a thin clamshell-type device.

BRIEF DESCRIPTION OF THE DRAWINGS

In order to describe the manner in which the above-recited and other features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used.

Figures 1, 2A, 2B:
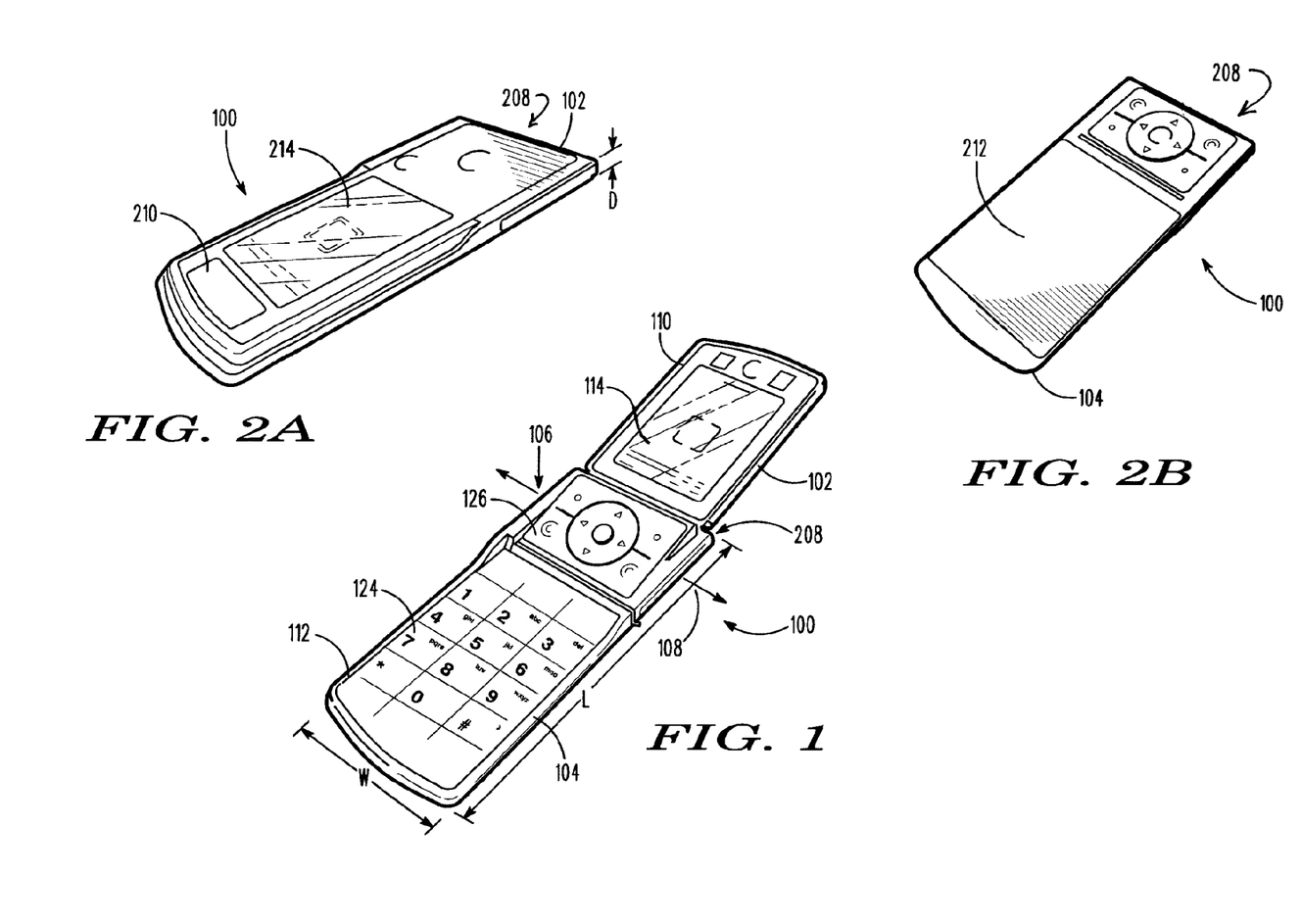
FIG. 1 is a perspective view of a handheld communication device in a first configuration, for example an opened position, in accordance with various aspects of the disclosure.
FIG. 2A is a front perspective view of the handheld communication device of FIG. 1, shown in a second configuration, for example a closed position.
FIG. 2B is a rear perspective view of the handheld communication device of FIG. 1, shown in the second configuration.

FIG. 1 is a front perspective view of an exemplary handheld communication device having at least a two-part housing, for example, a clamshell wireless communication device 100, shown in a first configuration, for example, an open configuration, FIG. 2A is a front perspective view of the handheld communication device 100, shown in a second configuration, for example, a closed configuration, and FIG. 2B is a rear perspective view of the handheld communication device 100 in the second configuration.

The device 100 may comprise an upper housing 102, which may be referred to as a flip, and a lower housing 104, which may be referred to as a base. The flip 102 and the base 104 may be coupled by a rotational coupling such as, for example, a hinge assembly 106. In some aspects, a first housing may comprise the upper housing 102, and a second housing may comprise the lower housing 104. In other aspects, the first housing may comprise the lower housing 104, and the second housing may comprise the upper housing 102.

The device 100 is relatively flat, which is to say that its depth D dimension is smaller than its width W and length L dimensions. In fact, relative to the illustrated embodiment, a reduced depth may be an overall design goal. The flip 102 may comprise a first inside surface 110 and a first outside surface 210. The base 104 may comprise a second inside surface 112, and a second outside surface 212.

The hinge assembly 106 allows the flip 102 to be rotated from the first configuration in which the flip 102 extends upward away from the lower part 104, i.e. open position, to the second configuration in which the flip 102 overlies the lower part 104, i.e. closed position. As will be discussed in more detail below, the hinge assembly 106 may have an axis 108 offset from a first end 208 of the device 100, when the device 100 is in the closed position.

According to various aspects, a main display 114 of the device 100 may be located at the first inside surface 110 of the flip 102 (FIG. 1), and an auxiliary display 214 may be located at the first outside surface 210 of the flip 102 (FIG. 2A). The main display 114 and the auxiliary display 214 may be useful for displaying control screens including menus and information related to communications including lists of received calls, lists of placed calls, telephone numbers in a phone book, email addresses and web addresses, as well as a list of selectable functions, among other things.

In various aspects, the flip 102 may comprise one or more buttons 301 (FIG. 5; not shown in FIGS. 1-4) on side edges of the flip 102 and/or the base 104. The button(s) may be used to generate signals for controlling various aspects of the operation of the device 100. For example, in one or more modes of operation of the device 100, a pair of buttons may be used as directional inputs, such as "UP" and "DOWN" commands, to control software of the device 100.

A first keypad 124 may be located on the inside surface 112 of the base 104. The first keypad 124 may include a cover (not shown) made of a sheet of flexible material. The flip 102 may include a second keypad 126 on the inside surface 110 thereof. In the open configuration, as shown in FIG. 1, the second keypad 126 is between and viewable with the first keypad 124 and the main display 114. The first and second keypads 124, 126 may appear seamless to a user when the device is in the open configuration. In the closed configuration, as shown in FIG. 2B, the second keypad 126 is adjacent and viewable with the outside surface 212 of the base 104. Thus, in the closed configuration, the second keypad 126 faces a direction opposite to the viewable direction of the auxiliary display 214. It should be appreciated that the second keypad 126 may be functionally operable when the device is in the open position and/or the closed position.

Figure 3:
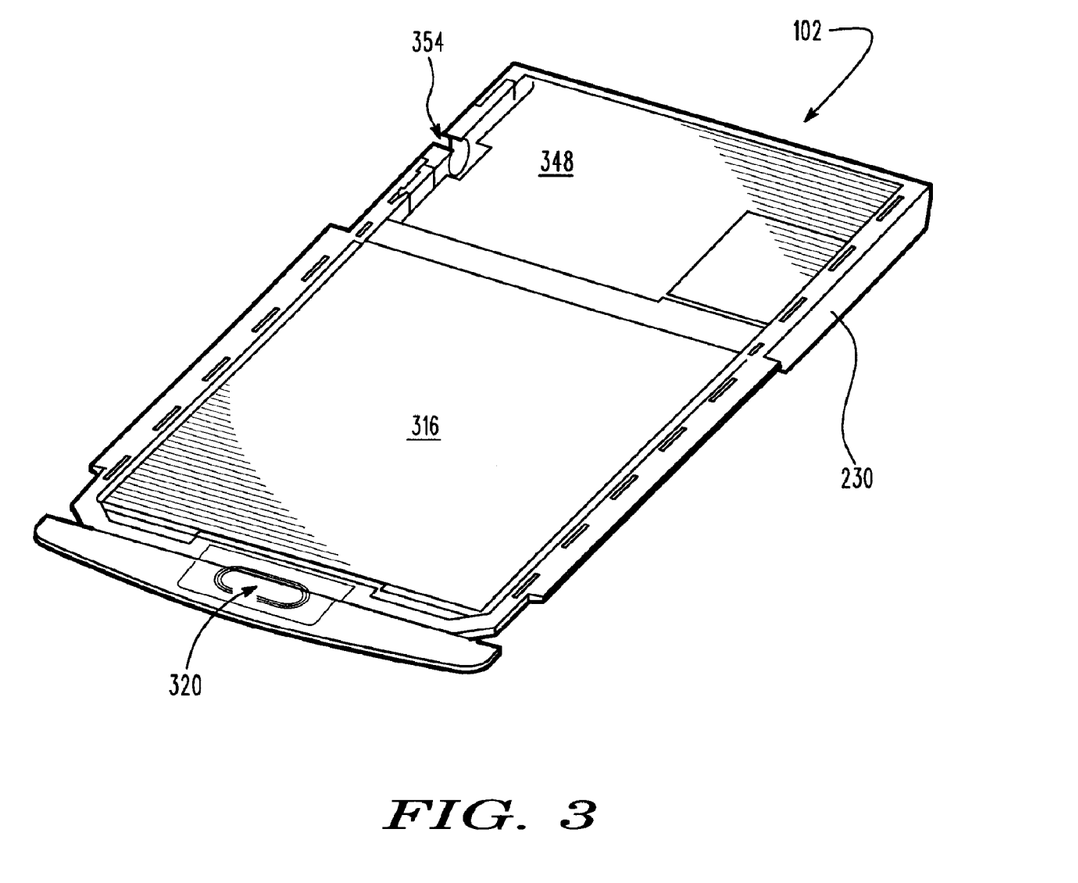
FIG. 3 is a perspective view of an upper housing of the handheld communication device shown in FIGS. 1, 2A, and 2B.

Referring now to FIG. 3 a number of components may be located in the flip 102. These components may include a display module 316, which includes the main display 114 and the auxiliary display 214, an earpiece speaker 320, and a main populated printed circuit board 348. The populated printed circuit board 348 may include communication and control circuits of the device 100.

Figure 4:
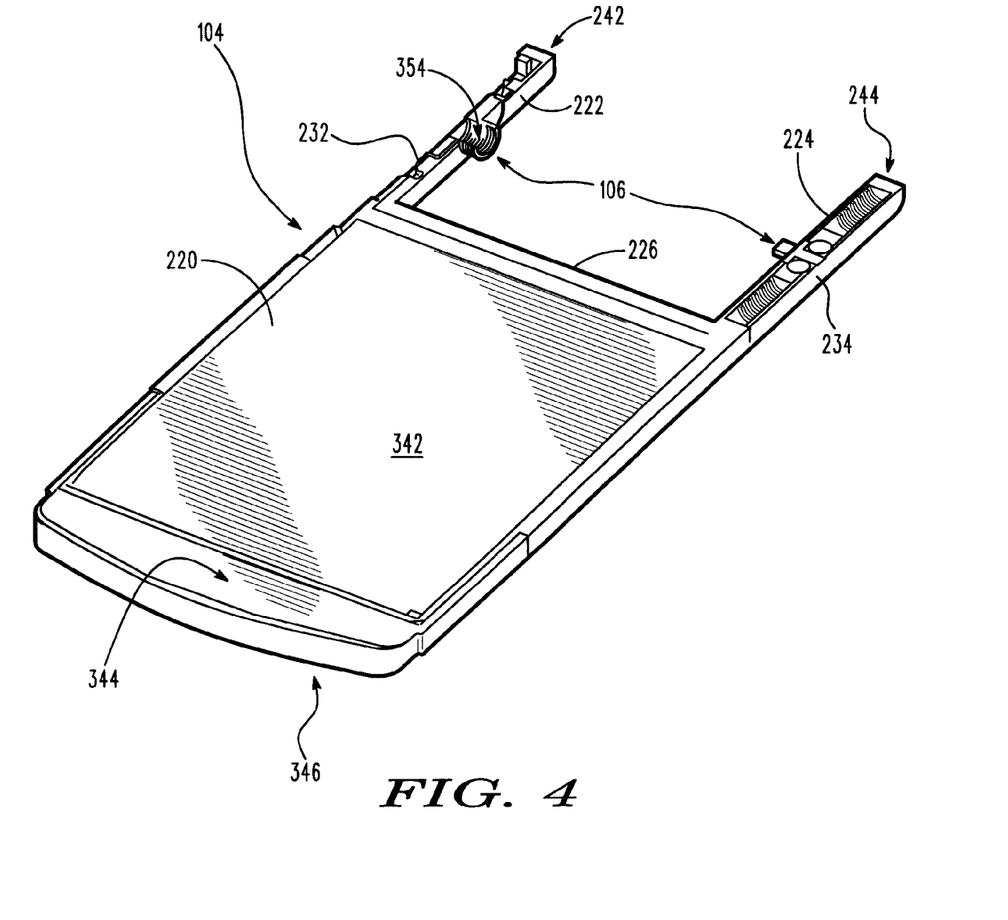
FIG. 4 is a perspective view of a lower housing of the handheld communication device illustrated in FIGS. 1, 2A, and 2B.

As shown in FIG. 4, the lower housing 104, or base, of the device 100 may house a battery 342 and an antenna 344. The antenna 344 may be located proximate a bottom end 346 of the base 104. In some aspects, positioning the various buttons 301 in the flip 102 may lead to users tending to position their hands closer to the flip 102 in order to more easily actuate the buttons. In this position, a user's hand will be positioned further away from the antenna 344 located near the bottom end 346 of the lower housing 104, and will absorb less energy from signals emanating from, or being received by, the antenna 344 thereby leading to improved Quality of Service (QoS). According to some aspects, the base 104 may include a transducer (not shown) adapted to provide vibrational feedback to the user.

Note that since the battery 342 is in the base 104 and the populated printed circuit board 348 is in the flip 102, the display module 316 may overlie the battery 342 when the device 100 is in the closed configuration. This arrangement allows the thickness of both the flip 102 and the base 104 to be minimized, as a result of fewer components being stacked within either housing part. As a result, the overall thickness of the device 100 in the closed configuration may be reduced, making the device 100 more convenient to carry. Also, since the battery 342 does not need to share the lower housing 104 with the circuit board 348, the length and width of the battery 342 may occupy a substantial portion of the base 104. Thus, battery size and capacity may be extended, which may in turn increase the duration of standby time and the amount of communication that can be conducted with the device 100 before battery recharging is necessary.

Figure 7:
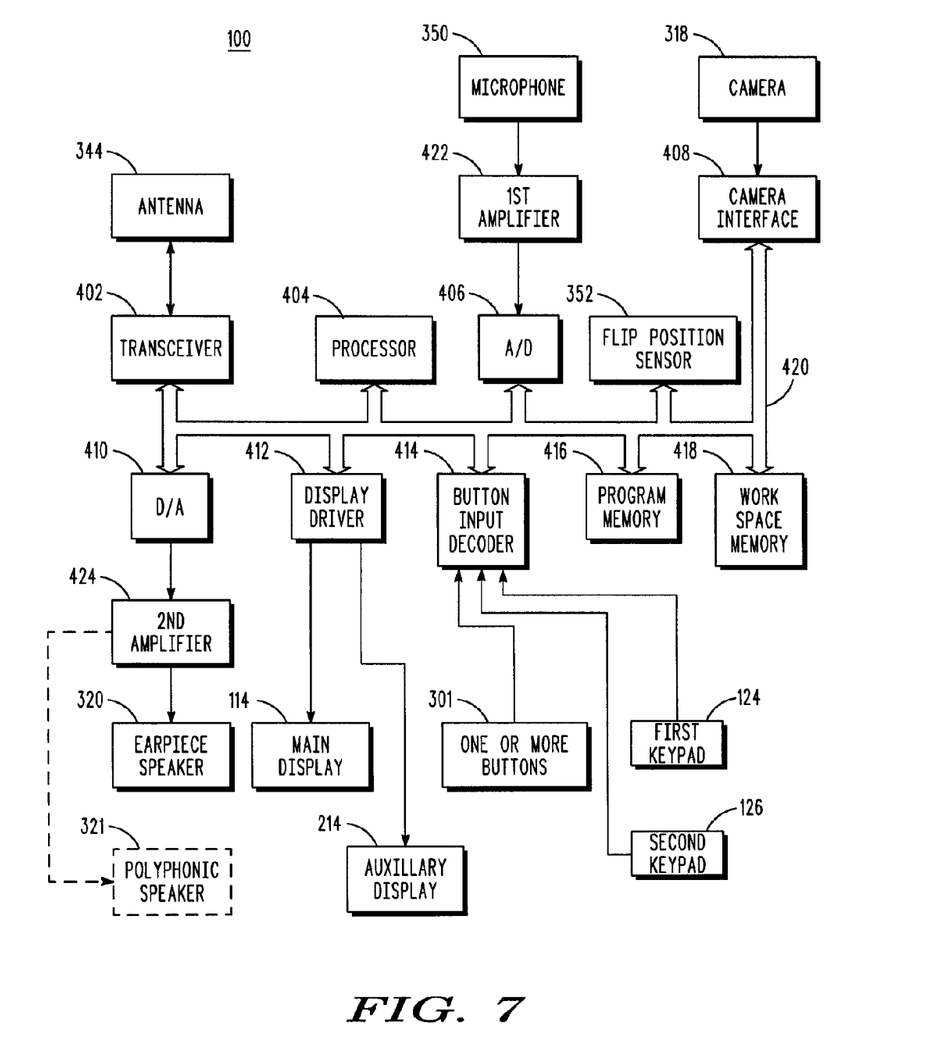
FIG. 7 is a block diagram of the handheld communication device shown in FIGS. 1-6.

It should be appreciated that the inside surface 112 of the base 104 may include a Hall effect sensor 352 (FIG. 7; not shown in FIGS. 1-6). The Hall effect sensor 352 may work in conjunction with a magnet (not shown) associated with the inside surface 110 of the flip to sense whether the flip 102 is positioned overlying the base 104, such as a proximately closed position, as shown in FIGS. 2A and 2B, or extended away from the base 104, such as in an opened position, as shown in FIG. 1. A flexible circuit feedthrough 354 connects circuits in the base 104 to circuits in the flip 102. In the assembled device 100 the flexible circuit feedthrough 354 passes through the hinge 106.

Referring again to FIG. 4, the base 104 includes a first arm 222 and a second arm 224 extending from a first end 226 of a main housing portion 220. The first and second arms 222, 224 are spaced apart from one another in the width W dimension of the device 100 so as to receive a main portion 230 of the flip 102 that includes the populated printed circuit board 348 and the second keypad 126. Thus, at least the main portion 230 of the flip 102 has a width less that a width of the flip, as determined by the outside edges 232, 234 of the arms 222, 224, which corresponds with the width W of the device 100.

The hinge assembly 106 and associated hinge axis 108 are disposed along the arms 222, 224 at a position spaced from the first end 226 of the main housing portion 220 and spaced from free ends 242, 244 of the arms 222, 224. In some aspects, the hinge assembly 106 and hinge axis 108 may be about half way between the first end 226 and the free ends 242, 244. This arrangement may be referred to as an "offset" hinge as compared with conventional clamshell-type phones that have a hinge at one end of the phone. As a result, the second keypad 126 may face in substantially the same direction as the first keypad 124 in an open configuration (FIGS. 1 and 6), and the second keypad 126 may face in a direction substantially opposite to the direction of the first keypad 124 in a closed configuration (FIGS. 2A and 2B).

In some aspects, the offset hinge design described above may facilitate one-hand opening of the clamshell-type device. For example, in conventional clamshell phones having a thickness comparable to the device 100 of the present disclosure, it is difficult for a user to insert his/her thumb between the upper and lower housings 102, 104 to open the phone. According to aspects of the disclosure, a user can hold the device 100 in his/her hand and use the index finger to urge an end 231 of the main portion 230 of the flip 102 toward the palm of his/her hand. The offset hinge assembly 106 allows the end 231 to rotate about the hinge axis 108 and thereby facilitate one-hand opening of the thin clamshell-type device 100.

Figure 5:
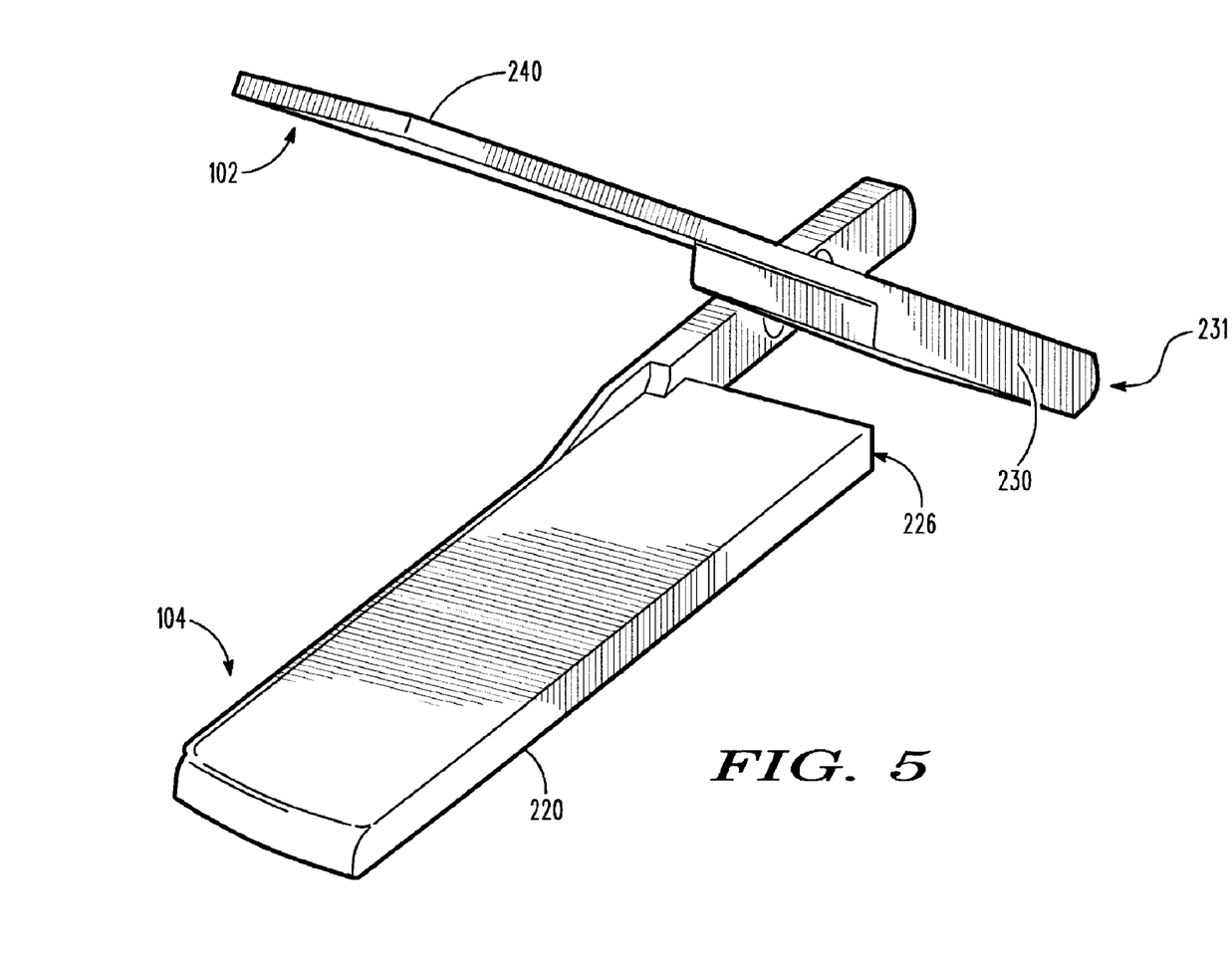
FIG. 5 is a cross-sectional perspective view of the handheld communication device of FIG. 1, shown in an open configuration.
Figure 6:
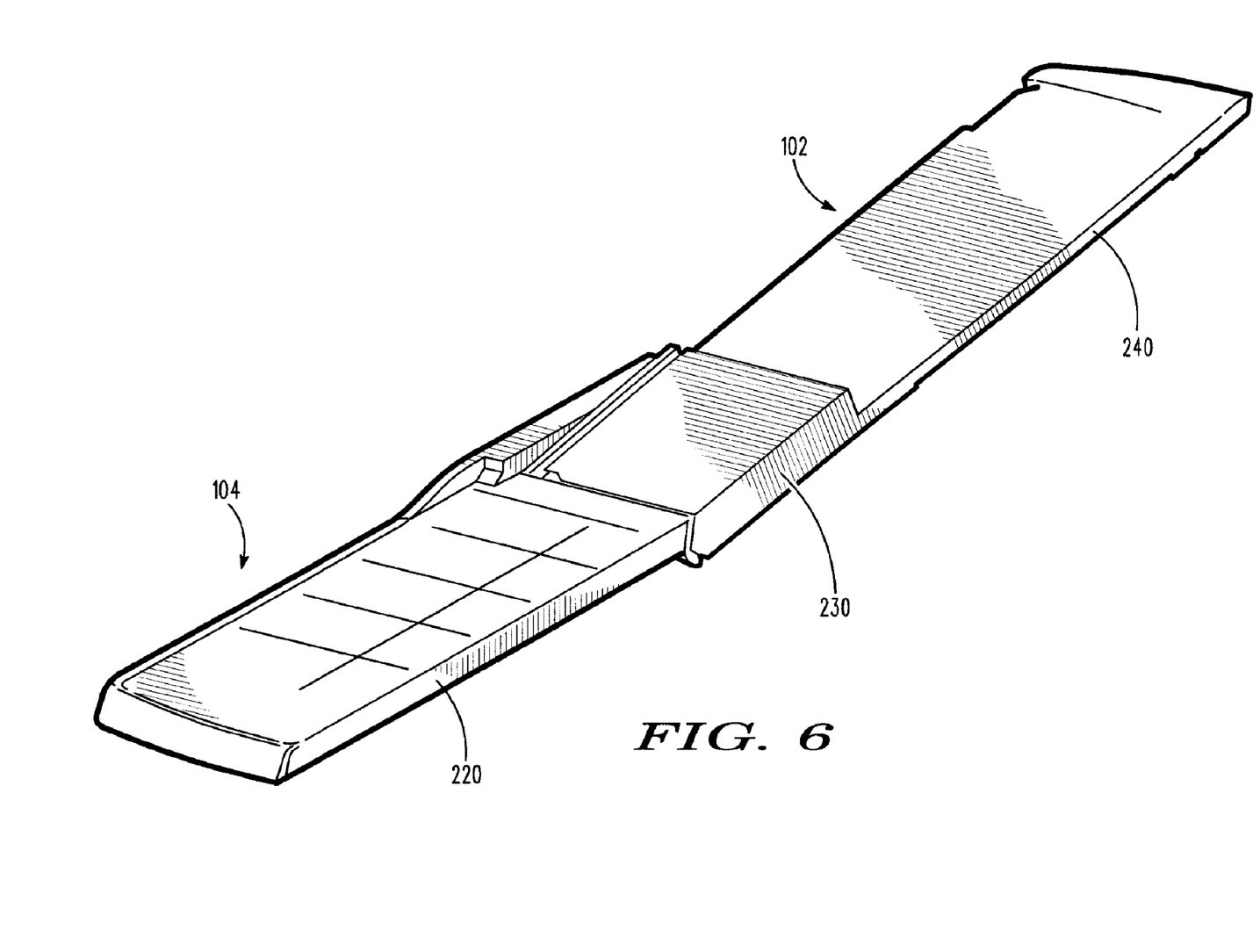
FIG. 6 is a cross-sectional perspective view of the handheld communication device of FIG. 1, shown in the first configuration.

Referring to FIGS. 5 and 6, it can be seen that the main portion 230 of the flip 102, which contains the main printed circuit board 348 and the second keypad 126 in a stacked configuration, is thicker than the remainder of the flip 102 and is thicker than any portion of the base 104. For example, the main portion 230 of the flip 102 has a greater thickness than that of the main housing portion 220 of the base 104. The main portion 230 of the flip 102 also has a thickness greater than that of a display portion 240 of the flip 102. Referring back to FIG. 2A, it can be seen that the combined thicknesses of the display portion 240 of the flip 102 and the main housing portion 220 of the base 104 are substantially equal to the thickness of the main portion 230 of the flip 102, which houses the printed circuit board 348.

The ability to package the main printed circuit board 348 in the thicker main portion 230 of the flip 102 and to have the axis of rotation through main circuit volume is enabled by the offset hinge assembly 106, which eliminates the need for the main portion 230 to overlie the base 104. Thus, the main printed circuit board 348 is not in a stacked configuration with the battery 342, as with conventional clamshell-type devices. In conventional clamshell-type devices, the stacked thickness of a battery and circuit board determine the overall thickness of the device. According to the present disclosure, the device 100 can have an overall thickness in the closed configuration that is substantially equal to the thickness of the main portion 230 of the flip 102 as determined by the combined thickness of the printed circuit board 348 and second keypad 126, which is less than what the combined thickness of the circuit board and battery would yield.

The first end 226 of the main housing portion 220 of the base 104 may serve as a flip-stop as the flip 102 is rotated relative to the base 104 into an open configuration. According to some aspects, as shown in FIG. 6, the first end 226 may be configured to stop rotation of the flip 102 relative to the base 104 when the angle between the flip 102 and base 104 is about 170°.

It may also be noticed from FIG. 2A that a width of the display portion 240 of the flip 102 overlying the base 104 in the closed position may be less than the width W dimension of the device 100, as determined by a width of the main housing portion 220 of the base 104. As a result, a user can hold the base 104 of the device 100 when in the closed position without holding the flip 102. Thus, the hand holding the device 100 may not impede opening of the device 100.

According to various aspects, the thickness of device 100 as determined by the thickness of the main portion 230 of the flip 102 and/or the combined thickness of the main housing portion 220 and the display portion 240 may be about 6 mm, for example, 5.9 mm. According to some aspects, the hinge assembly 106 and associated hinge axis 108 may be spaced about 10-12 mm from the first end 208 of the device 100. In various aspects, each of the arms 222, 224 may comprise at least 20-30% of the length of the base 104, which corresponds to about 20-30% of the length L dimension of the device 100. For example, each of the arms 222, 224 may comprise about 25% of the length of the base 104, which corresponds to about 25% of the length L dimension of the device 100.

As shown in FIGS. 5 and 6, the arms 222, 224 that extend from the first end 226 of the main housing portion 220 of the base 104 may also extend past the first end 226 so as to overlie a portion of the main housing portion 220. Each of the arms 222, 224 may have a depth D at their free ends 242, 244 substantially equal to the depth of the device 100. As the arms 22, 224 extend over the main housing portion 220, their depth may taper until substantially matching the depth of the main housing portion 220. The increased depth of the arms 222, 224 toward their free ends 242, 244 provides more surface area, which may facilitate a secure grasp by a user such as, for example, when holding the device in one hand while attempted to open the device one-handed with that same hand.

FIG. 7 is a block diagram of the handheld communication device 100 shown in FIGS. 1-6. As shown in FIG. 7, the device 100 may comprise a transceiver 402, a processor 404, an analog-to-digital converter (A/D) 406, the flip position sensor 352, a camera interface 408, a digital-to-analog converter (D/A) 410, a display driver 412, a button interface decoder 414, a program memory 416, and a workspace memory 418 coupled together through a system bus 420.

The transceiver 402 may be coupled to the antenna 344. Radio Frequency and/or microwave signals that are modulated with encoded data (e.g., digitized voice audio, text messages, photos, etc.) pass between the transceiver 402 and the antenna 344.

The processor 404 executes control programs, and may also perform communication encoding and decoding tasks. Programs executed by the processor 404 are stored in the program memory 416. The processor 404 uses the workspace memory 418 in executing programs. The processor 404 is suitably part of a highly integrated micro-controller integrated circuit. The micro-controller suitably includes one or more of the other above mentioned components that are coupled together through the signal bus 420. The transceiver 402, the processor 404, and optionally other blocks shown in FIG. 7 are embodied in circuits of the populated printed circuit board 348.

A microphone 350 associated with, for example, the base 104 may be coupled through a first amplifier 422 to the A/D 406. The A/D 406 is used to digitize a user's spoken words, which are then encoded by a voice encoder (vocoder) component of the processor.

A camera 318 may be incorporated as part of the handheld device 100 and may be interfaced to the processor 404 through the camera interface 408. The camera interface 408 reads and digitizes pixel data from the camera 318, and makes such data available to the processor 404 for further processing, e.g., image/video compression encoding.

The button input decoder 414 may be coupled to one or more buttons 301, which may include buttons located in the flip 102 and/or base 104, as well as to the keys of the keypad 124. The button input decoder 414 receives the electrically encoded actuation signals from the first keypad 124, the second keypad 126, and the one or more buttons 301 and identifies each depressed key or button to the processor 404.

The display driver 412 drives the main display 114 and the auxiliary display 214. The D/A 410 drives the earpiece speaker 320 through a second amplifier 424. A similar or the same circuit could also be used to drive a polyphonic speaker 321.

It is noted that, as used in this specification and the appended claims, the singular forms "a," "an," and "the," include plural referents unless expressly and unequivocally limited to one referent. Thus, for example, reference to "a user input" includes two or more different user inputs. As used herein, the term "include" and its grammatical variants are intended to be non-limiting, such that recitation of items in a list is not to the exclusion of other like items that can be substituted or other items that can be added to the listed items.

It will be apparent to those skilled in the art that various modifications and variations can be made in the devices and methods of the present disclosure without departing from the scope of the invention. Other embodiments of the invention will be apparent to those skilled in the art from consideration of the specification and practice of the invention disclosed herein. It is intended that the specification and examples be considered as exemplary only.

What is claimed is:

1. A handheld communication device, comprising:
a first housing including a first keypad, and a battery and a first arm and a second arm each extending from a first end of a main portion of the first housing and each terminating in a free end, the first and second arms being spaced from one another in a width dimension of the device;
a second housing including a second keypad, at least one display, and a printed circuit board, the second housing being rotatable relative to the first housing between an open configuration and a closed configuration, the second keypad facing in a substantially same direction as the first keypad in the open configuration, and the second keypad facing in a substantially opposite direction to the first keypad in the closed configuration, the second keypad is between the first and second arms in the width dimension; and
a hinge assembly coupling the main portion of the first housing with the first arm and the second arm, the hinge assembly having a hinge axis offset from the free ends of the first and second arms and the first end of the main portion such that a user holding the device with one hand can place the device in an open configuration by applying an urging force with a finger of said one hand to the first end of the main portion in a direction toward the palm of said hand.

2. The device of claim 1, wherein between the first end of the main portion and the free ends of the first and second arms in a longitudinal dimension of the device.

3. The device of claim 1, wherein each of the first and second arms comprises 20-30% of a longitudinal dimension of the device.

4. The device of claim 1, wherein at least one of the first arm and the second arm has a first depth dimension at a free end thereof and a second depth dimension, less than the first dimension, where the at least one arm meets a base.

5. The device of claim 4, wherein the second housing further includes a display portion including the at least one display, the display portion having a third depth, the third depth being less than the second depth of the main portion.

6. The device of claim 1, wherein the display portion is configured to substantially overlie at least a portion of the first housing in the closed configuration, the combined first and third depths being substantially the same as the second depth.

7. The device of claim 1, wherein the display portion of the second housing has a width that is less than the main portion of a base.

8. A handheld communication device, comprising:
a first housing comprising a main portion housing a first keypad and a battery, and a first arm and a second arm each extending from a first end of the main portion and each terminating in a free end, the first and second arms being spaced from one another in a width dimension of the device;
a second housing including a second keypad, at least one display, and a printed circuit board, the second housing being rotatable relative to the first housing between an open configuration and a closed configuration, the second keypad being between the first and second arms in the width dimension and being between the first end of the main portion and the free ends of the first and second arms in a longitudinal dimension of the device: and
a hinge assembly coupling the main portion of the first housing with the first arm and the second arm, the hinge assembly having a hinge axis offset from the free ends of the first and second arms and the first end of the main portion such that a user holding the device with one hand can place the device in an open configuration by applying an urging force with a finger of said one hand to the first end of the main portion in a direction toward the palm of said hand.

9. The device of claim 8, wherein each of the first and second arms comprises 20-30% of a longitudinal dimension of the device.

10. The device of claim 8, wherein the second keypad is configured to face in a substantially same direction as the first keypad in the open configuration, and the second keypad is configured to face in a substantially opposite direction to the first keypad in the closed configuration.

11. The device of claim 8, wherein the first housing has a first depth, the second housing comprising:
a main portion including the second keypad and the printed circuit board overlying one another in a depth dimension, the main portion having a second depth, the second depth being greater than the first depth.

12. The device of claim 11, wherein the second housing further includes a display portion including the at least one display, the display portion having a third depth, the third depth being less than the second depth of the main portion.

13. The device of claim 12, wherein the display portion is configured to substantially overlie at least a portion of the first housing in the closed configuration, the combined first and third depths being substantially the same as the second depth.

14. A handheld communication device, comprising:
a first housing including a first keypad, a battery and a first arm and a second arm each extending from a first end of a main portion and each terminating in a free end, the first and second arms being spaced from one another in a width dimension of the device, the first housing gave has a first depth;
a second housing comprising a main portion including a second keypad and a printed circuit board overlying one another in a depth dimension, the main portion having a second depth, the second depth being greater than the first depth, the second keypad is between the first and second arms in the width dimension; and
a display portion including at least one display, the display portion having a third depth, the third depth being less than the second depth of the main portion, the second housing being rotatable relative to the first housing between an open configuration and a closed configuration, the display portion substantially overlying at least a portion of the first housing in the closed configuration, the combined first and third depths being substantially the same as the second depth, and
a hinge assembly coupling the main portion of the first housing with the first arm and the second arm, the hinge assembly having a hinge axis offset from the free ends of the first and second arms and the first end of the main portion such that a user holding the device with one hand can place the device in an open configuration by applying an urging force with a finger of said one hand to the first end of the main portion in a direction toward the palm of said hand.

15. The device of claim 14, wherein the first housing comprises:
a main portion housing the first keypad and the battery; and
a first arm and a second arm each extending from a first end of the main portion and each terminating in a free end, the first and second arms being spaced from one another in a width dimension of the device.

16. The device of claim 15, wherein the second keypad is between the first and second arms in the width dimension and between the first end of the main portion and the free ends of the first and second arms in a longitudinal dimension of the device.

17. The device of claim 15, wherein each of the first and second arms comprises 20-30% of a longitudinal dimension of the device.

18. The device of claim 15, further comprising a hinge assembly coupling the main portion of the first housing with the first arm and the second arm, the hinge assembly having a hinge axis offset from the free ends of the first and second arms.

19. The device of claim 14, wherein the second keypad is configured to face in a substantially same direction as the first keypad in the open configuration, and the second keypad is configured to face in a substantially opposite direction to the first keypad in the closed configuration.

20. A handheld communication device, comprising:
a first housing comprising a main portion housing, and
a first arm and a second arm each extending from a first end of the main portion and each terminating in a free end;
a second housing being rotatable relative to the first housing between an open configuration and a closed configuration, the second housing having a main portion between the first and second arms, the main portion having a first end substantially aligned with the free ends of the first and second arms; and
a hinge assembly coupling the second housing to the first and second arms, the hinge assembly having a hinge axis offset from the first and second arms and the first end of the main portion such that a user holding the device with one hand can place the device in an open configuration by applying an urging force with a finger of said one hand to the first end of the main portion in a direction toward the palm of said hand.

21. The device of claim 20, wherein at least one of the first arm and the second arm has a first depth dimension at a free end thereof and a second depth dimension, less than the first dimension, where the at least one arm meets a base.

22. The device of claim 20, wherein the second housing includes a second keypad, at least one display, and a printed circuit board, the display portion of the second housing having a width that is less than the main portion housing of a base.

* * * * *